United States Patent
Szollar (10) Patent No.: US 10,803,517 B2
(45) Date of Patent: Oct. 13, 2020

(54) EXTRACTING BEHAVIORS AND SUGGESTING BEHAVIORS TO ACHIEVE A DESIRED CREDIT SCORE

(71) Applicant: NCR Corporation, Duluth, GA (US)

(72) Inventor: Suzan Szollar, Menlo Park, CA (US)

(73) Assignee: NCR Corporation, Atlanta, GA (US)

( * ) Notice: Subject to any disclaimer, the term of this patent is extended or adjusted under 35 U.S.C. 154(b) by 577 days.

(21) Appl. No.: 14/814,716

(22) Filed: Jul. 31, 2015

(65) Prior Publication Data

US 2017/0032460 A1  Feb. 2, 2017

(51) Int. Cl.
*G06Q 40/02* (2012.01)

(52) U.S. Cl.
CPC ................... *G06Q 40/025* (2013.01)

(58) Field of Classification Search
CPC .......... G06Q 10/0635; G06Q 20/4016; G06Q 40/08; G06Q 30/0224; G06Q 30/0226
See application file for complete search history.

(56) References Cited

U.S. PATENT DOCUMENTS

| 7,970,676 B2* | 6/2011 | Feinstein | G06Q 20/10 705/35 |
| 9,348,924 B2* | 5/2016 | Somekh | G06F 16/9535 |
| 9,881,102 B2* | 1/2018 | Gordner | G06F 16/3322 |
| 2004/0199456 A1* | 10/2004 | Flint | G06Q 40/025 705/38 |
| 2006/0004654 A1* | 1/2006 | Kornegay | G06Q 40/025 705/39 |
| 2008/0222132 A1* | 9/2008 | Pan | G06F 16/9535 |
| 2010/0106586 A1* | 4/2010 | Etheredge | G06Q 30/0224 705/14.18 |
| 2011/0078073 A1* | 3/2011 | Annappindi | G06Q 40/025 705/38 |
| 2012/0066106 A1* | 3/2012 | Papadimitriou | G06Q 40/02 705/35 |
| 2012/0190386 A1* | 7/2012 | Anderson | G01S 19/14 455/456.3 |
| 2012/0317064 A1* | 12/2012 | Hagiwara | A61B 5/6898 706/46 |

(Continued)

OTHER PUBLICATIONS https://www.creditkarma.com/question/need-percentage-of-on-time-payments-to-raise-quickly (Year: 2014).*

(Continued)

*Primary Examiner* — Kito R Robinson
*Assistant Examiner* — Tony P Kanaan
(74) *Attorney, Agent, or Firm* — Schwegman, Lundberg & Woessner (57) ABSTRACT

System and methods for extracting behaviors and suggesting behaviors to achieve a desired credit score may include receiving, via a network, account data including information regarding currency outlays made by a first sample population; generating, by a computing device, a plurality of behavior patterns based on currency outlay patterns extracted from the account data; receiving, by the computing device, credit score data for the first sample population; formulating, by the computing device, a model for predicting a credit score change; and storing the model on a data storage device. The model may include variables corresponding to each of the plurality of behavior patterns and a likely credit score affect.

14 Claims, 6 Drawing Sheets

(56) References Cited

U.S. PATENT DOCUMENTS

| | | | | |
|---|---|---|---|---|
| 2013/0054447 A1* | 2/2013 | Ross | ................... | G06Q 40/025 |
| | | | | 705/38 |
| 2013/0185189 A1* | 7/2013 | Stewart | ............... | G06Q 40/025 |
| | | | | 705/38 |
| 2013/0216989 A1* | 8/2013 | Cuthbert | ............... | A61B 5/721 |
| | | | | 434/238 |
| 2013/0218616 A1* | 8/2013 | Pinchuk | ............. | G06Q 30/0202 |
| | | | | 705/7.11 |
| 2014/0074688 A1* | 3/2014 | Shvarts | ................ | G06Q 30/02 |
| | | | | 705/38 |
| 2014/0156501 A1* | 6/2014 | Howe | ................. | G06Q 40/025 |
| | | | | 705/38 |
| 2017/0032460 A1* | 2/2017 | Szollar | ................ | G06Q 40/025 |
| 2017/0228820 A1* | 8/2017 | Rohn | .................. | G06Q 40/025 |

OTHER PUBLICATIONS

Authors: "Alexandra Brown, J. M. Collins, M. Schmeiser, and C. Urban", Title: "State Mandated Financial Education and the Credit Behavior of Young Adults", Date: "2014-68", Publisher: "Finance and Economics Discussion Series Divisions of Research & Statistics and Monetary Affairs Fed", pp. 1-5 (Year: 2014).*

* cited by examiner

EXTRACTING BEHAVIORS AND SUGGESTING BEHAVIORS TO ACHIEVE A DESIRED CREDIT SCORE

BACKGROUND

A credit score is a number used to represent a person's creditworthiness. Lenders, such as banks and credit card companies, use credit scores to evaluate the potential risk posed by lending money to consumers and to mitigate losses. In other words, lenders use credit scores to determine who qualifies for a loan and who does not. For those that do qualify, a credit score is used to determine at what interest rate and what credit limits a borrower may borrow money.

SUMMARY

System and methods for extracting behaviors and suggesting behaviors to achieve a desired credit score may include receiving, via a network, account data including information regarding currency outlays made by a first sample population; generating, by a computing device, a plurality of behavior patterns based on currency outlay patterns extracted from the account data; receiving, by the computing device, credit score data for the first sample population; formulating, by the computing device, a model for predicting a credit score change; and storing the model on a data storage device. The model may include variables corresponding to each of the plurality of behavior patterns and a likely credit score affect.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit the disclosure. Instead, the proper scope of any invention disclosed herein is defined by the appended claims.

The actual formulas and models used to calculate a credit score are closely guarded trade secrets. Because of this, outside of a credit-scoring entity, no one really knows how to get to a good credit score or what steps may lead to increases in a credit score. Even though people have some idea of things that might lead to a good credit score, such as paying off credit card balances each month, they don't necessarily do these things.

Using a combination of data from various sources a model can be developed that will allow for a probabilistic outcome with a high level of uncertainty (e.g., "I think if I pay off my credit card bill it will improve my credit score") to something that is much closer to a deterministic outcome ("If I don't buy coffee every morning and put the extra money toward my credit card balance my credit score will increase by 50 points over six months.").

Using past spending, payment, and credit score data, how many credit cards you have, demographics, etc. models can be generated that can be used to drive behavior. For example, using the model, which may correspond to behavioral economic models, suggested behaviors can be provided and presented to a user in the form of advice or other facts. For instance, a message can be given to a user such as, "Your credit score is about 50 points lower than people similar to yourself," which taps into herd mentality to nudge/motivate the user.

To generate the models, historic data, (e.g., data from the last five years) can be analyzed and behaviors extracted. The extracted behaviors can be used as variables in models that may predict changes in a credit score. The models may be created using various statistical and regression analysis.

Using the models, behaviors that have led to increases and decreases in credit scores can be identified. In addition, time frames for achieving given changes can be identified as well. Once the behaviors are identified, a user's behavior can be monitored and suggestions made to allow the user to achieve a desired outcome, such as an increase in his or her credit score.

The models can be refined on an ongoing basis using new data. For example, as a user implements suggested behaviors changes in his or her credit score can be monitored and compared to predicted changes. Based on how well the actual changes in a user's credit score match the predicted changes, various terms in the models may be given more or less weight in generating future predictions and changes.

Consistent with some embodiments disclosed herein, a method may include receiving, via a network, account data including information regarding currency outlays made by a first sample population; generating, by a computing device, a plurality of behavior patterns based on currency outlay patterns extracted from the account data; receiving, by the computing device, credit score data for the first sample population; formulating, by the computing device, a model for predicting a credit score change, and storing the model on a data storage device. The model may include variables corresponding to each of the plurality of behavior patterns and a likely credit score affect; and The information regarding currency outlays may include information regarding payments made on credit accounts by the first sample population and spending data including information regarding purchases made.

The plurality behavior patterns may include a plurality of payment and spending behaviors that may be defined by at least one payment characteristic of the payments made on the credit accounts and at least one spending characteristic of the purchases made, respectively.

A payment characteristic may include at least one of an on-time payment, a payment in full, and a minimum payment. A spending characteristic may include at least one of a consumer purchase and a regularly occurring purchase. The credit score data may correspond to the information regarding currency outlays.

Generating the plurality of behavior patterns may include defining permutations of the plurality of payment and spending behaviors. The model may be formulated according to at least one of a statistical analysis, a Monte Carlo simulation, a single variable regression analysis, and a multivariable regression analysis. The method may further include validating the model against account and credit score data of a second sample population.

The method may further include: receiving updated credit score data for the first sample population; processing each credit scored included in the updated credit score data. When an updated credit score of an individual is greater than the individual's previous credit score, the model may be grade with a positive value. When the updated credit score of the individual is less than the individual's prior credit score, a behavior pattern may be graded with a negative value. A behavior pattern may be removed from the model when an accumulation of negative values exceeds a threshold.

Behavior patterns may include paying a percentage of a total balance on a credit card account that is less than the total balance; carrying, by a consumer, a balance on a credit card; opening a plurality of credit lines within a predetermined time period; and closing a credit account within the predetermined time period. In addition, extracted behavior patterns may be parsed based upon age groups and other demographics, psychographics, etc.

The method may further include: receiving account data of a subject; extracting behavior patterns of the subject from the account data; matching the subject's extracted behavior patterns with select behavior patterns included in the model that are likely to improve a credit score of the subject based on following a behavior of the select behavior patterns; and outputting the select behavior patterns as behavior recommendations for the subject.

The method may further include: receiving an input indicating that the behavior of the select behavior patterns was not followed; and providing a second behavior of the select behavior patterns to the user.

Figure 1:
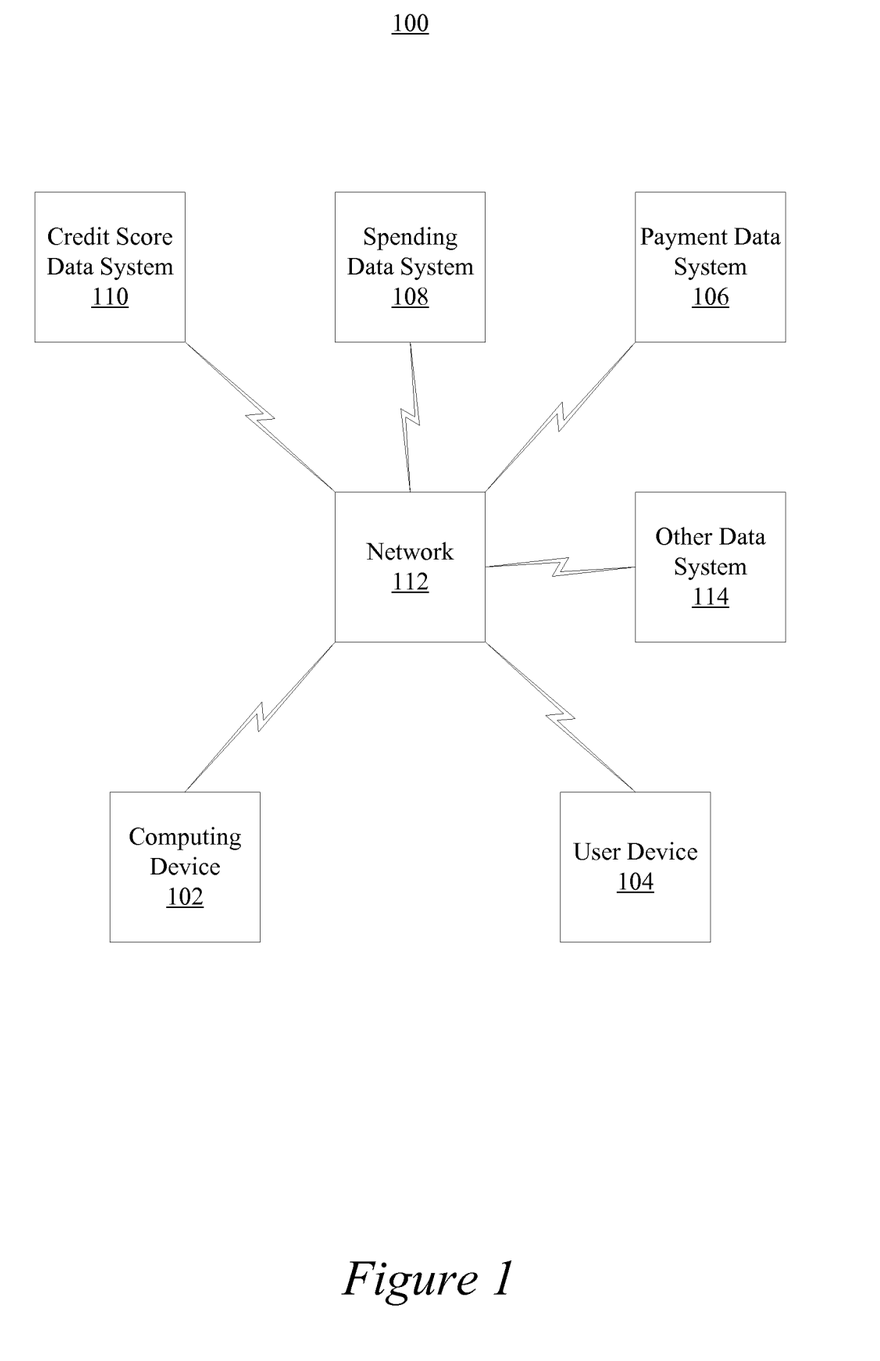
FIG. 1 shows an operating environment for extracting behaviors and suggesting behaviors to achieve a desired outcome consistent with embodiments of the disclosure.

FIG. 1 shows an operating environment 100 for extracting behaviors and suggesting behaviors to achieve a desired outcome consistent with the disclosure. Operating environment 100 may include a computing device 102, a user device 104, a payment data system 106, a spending data system 108, and a credit score data system 110. Computing device 102, user device 104, payment data system 106, spending data system 108, and credit score data system 110 may be connected via a network 112. Non-limiting examples of network 112 include the Internet, a local area network, a wide area network, etc. In addition, other data system 114 may also supply data.

Computing device 102, payment data system 106, spending data system 108, and credit score data system 110 may be located at different locations or may be located at the same location. For example, payment data system 106 and spending data system 108 may be located at a first location, credit score data system 110 may be located at a second location and computing device may be located at a third location. Each of the data systems may be maintained by a single entity or by multiple entities. For instance, payment data system 106 and spending data system 108 may be maintained by a first entity, credit score data system 110 may be maintained by a second entity, and computing device 102 may be operated by a third entity.

While FIG. 1 shows payment data system 106, spending data system 108, credit score data system 110, and other data system 114 being single entities, there may be multiples of each data system. For example, multiple providers may provide payment data and spending data. For example, a first credit card company may provide a first spending data and a first payment data and a second credit card company may provide a second spending data and a second payment data.

During operation, computing device 102 may receive payment data from payment data system 106, spending data from spending data system 108, credit score data from credit score data system 110, and other data, such as demographic data, etc., from other data system 114 via network 112. The payment data may be from a single payment data system or multiple payment data systems. For example, computing device 102 may receive payment data from one or more credit card issuers, one or more banks or other financial institutions that have extended credit to a user and to which the user makes payments. For instance, a first payment data system may be a credit card issuer and a second payment data system may be a bank that has made a loan to the user and the user is currently in repayment.

The payment data may be course data or fine data. For example, course data may include only an amount a user pays toward a credit card balance in a given month for all credit cards the user may have. Fine payment data may include an amount paid on each credit card, the date the payment was made, the method of payment (e.g., check or bank transfer), a percentage of the charges made for a given month that the payment represents, a percentage of the outstanding balance on the credit card the payment represents, if the payment was late (and by how many days the payment was late), etc.

The spending data may be received by one or more spending data systems. For example, computing device 102 may receive spending data from one or more credit card issuers, one or more banks or other financial institutions were a user has been issued a debit card, or one or merchants that track a user's spending. For example, a merchant may track a user's spending based on the user being enrolled in a loyalty program, or based on a form of payment (e.g., a credit card, debit card, or checking account number obtained from a check written by the user). The spending data captured by the merchant may be received by computing device 102 from the merchant that is operating a spending data system, such as spending data system 108.

In addition, the spending data may be received from a budgeting program used by a user. For example, a user may track his or her spending using a budgeting application or website such as Mint.com or FinanceWorks from Digital Insight. The budgeting application or website may forward the spending data to computing device 102.

The spending data may be course data or may be fine data. For example, course spending data may include a total amount a user spent from his or her checking account and using his or her credit cards for a given month. Fine spending data may include an amount spent using a user's credit card as well as a breakdown as to what items were purchased, from what retailers the items were purchased, the date and time the items were purchased, a percentage of how much the spending represents of a total credit line for a particular account, etc.

The credit score data may be received from one or more credit score systems. For example, credit score data may be received from one or more credit bureaus. The credit score data may include a current credit score and well as past credit scores. For example, the credit score data may include a credit score for the current month and credit scores for the past twelve months and past years as well.

The credit score data may be course data or fine data. For example, course credit score data may consist of only the current credit score. Fine credit score data may include the current credit score along with the credit score for the past 12 month (or any number of months and years) as well as the date the credit score changed, the number of points the credit score changed, etc.

Other data may include demographic data, data from social media websites, banking information from financial institutions (e.g., banks, brokerage firms, etc.), utility companies, government agencies (e.g., motor vehicle registration, the IRS, etc.) The other data may be course or may be fine. For example, data from motor vehicle registration may include only a current automobile owned by users. Fine other data may include ever make, model, model, year, amount paid for, the color, the engine size, etc. for every automobile user has ever owned or leased.

Computing device 102 may receive the payment data, spending data, and credit score data via a push or pull mechanism or at regular intervals. For example, whenever the payment data, spending data, and credit score data change, the respective system may push the data to computing device 102. In addition, computing device 102 may request the data at regular intervals, such as, but not limited to, once a quarter, a month, once a week, every day, etc.

As will be described below, computing device 102 may use the payment data, the spending data, and the credit score data to extract a pattern of behaviors from the payment data and the spending data. Computing device 102 may used the pattern of behaviors and the credit score data to formulate a model that may indicated a change in a user's credit score based on the pattern of behaviors. Once the model has been formulated, computing device 102 may provide a suggested behavior. The suggested behavior may be intended to raise the user's credit score. As will be discussed herein, the suggested behavior can be provided in real time (e.g., when a user is making a purchase), or at regular or irregular time intervals.

Figure 2:
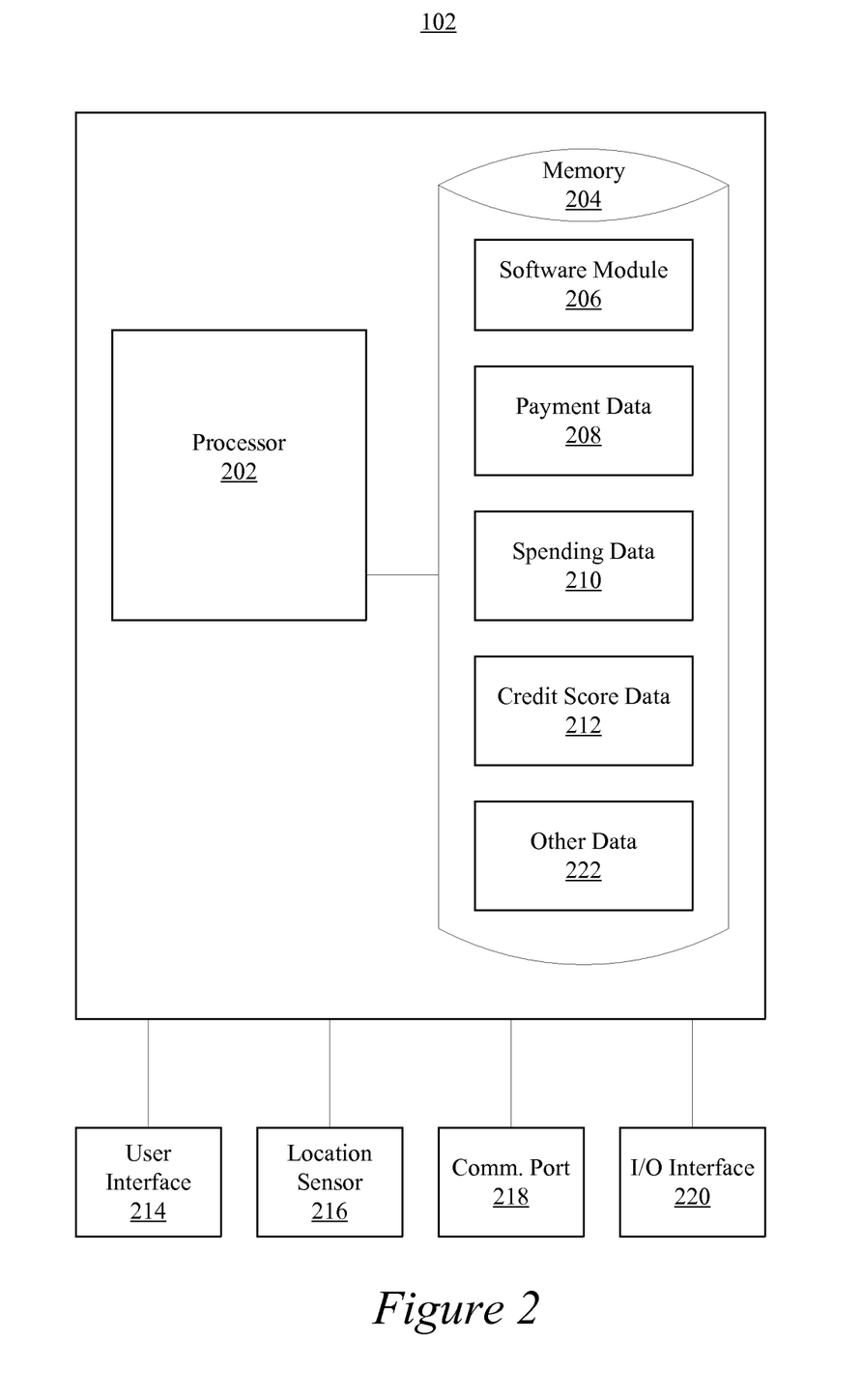
FIG. 2 shows an example schematic of a computing device consistent with embodiments of the disclosure.

FIG. 2 shows an example schematic of computing device 102. As shown in FIG. 2, computing device 102 may include a processor 202 and a memory unit 204. Memory unit 204 may include a software module 206, payment data 208, spending data 210, credit score data 212, and other data 222. While executing on processor 202, software module 204 may perform processes for extracting behaviors and suggesting behaviors to achieve a desired outcome, including, for example, one or more stages included in method 300 or subroutines 306, 312, and 314 described below with respect to FIGS. 3-6.

Payment data 208 may include the payment data described above. Spending data 210 may include the spending data described above. Credit score data 212 may include the credit score information described above. Other data 222 may include other data information described above.

Computing device 102 may also include a user interface 214. User interface 214 can include any number of devices that allow a user to interface with computing device 102. Non-limiting examples of user interface 214 include a keypad, a microphone, a speaker, a display (touchscreen or otherwise), etc.

Computing device 102 may also include a location sensor 216. Location sensor 216 can include any number of devices that provides information to allow computing device 102 to determine its location. A non-limiting example of location sensor 216 includes a GPS receiver.

Computing device 102 may also include a communications port 218. Communications port 218 may allow computing device 102 to communicate with data systems such as those described above with regard to FIG. 1. Non-limiting examples of communications port 218 include, Ethernet cards (wireless or wired), etc.

Computing device 102 may also include an input/output (I/O) device 220. I/O device 220 may allow computing device 102 to receive and output information. Non-limiting examples of I/O device 220 include, a camera (still or video), a printer, a scanner, etc.

Computing device 102 may be implemented using a personal computer, a network computer, a mainframe, a handheld device, a personal digital assistant, a smartphone, or any other similar microcomputer-based workstation or be SaaS based. Computing device 102 may be located in close proximity to the various data systems described herein. Computing device 102 may also be remote from the various data systems described herein. Computing device 102 and user device 104 can also be the same device. For example, computing device 102 may be a smart phone or desktop computer used by a user (i.e., user device 104). In addition, computing device 102 may be a plurality of remote servers connected to the various data systems and user device 104 via network 114.

Figure 3:
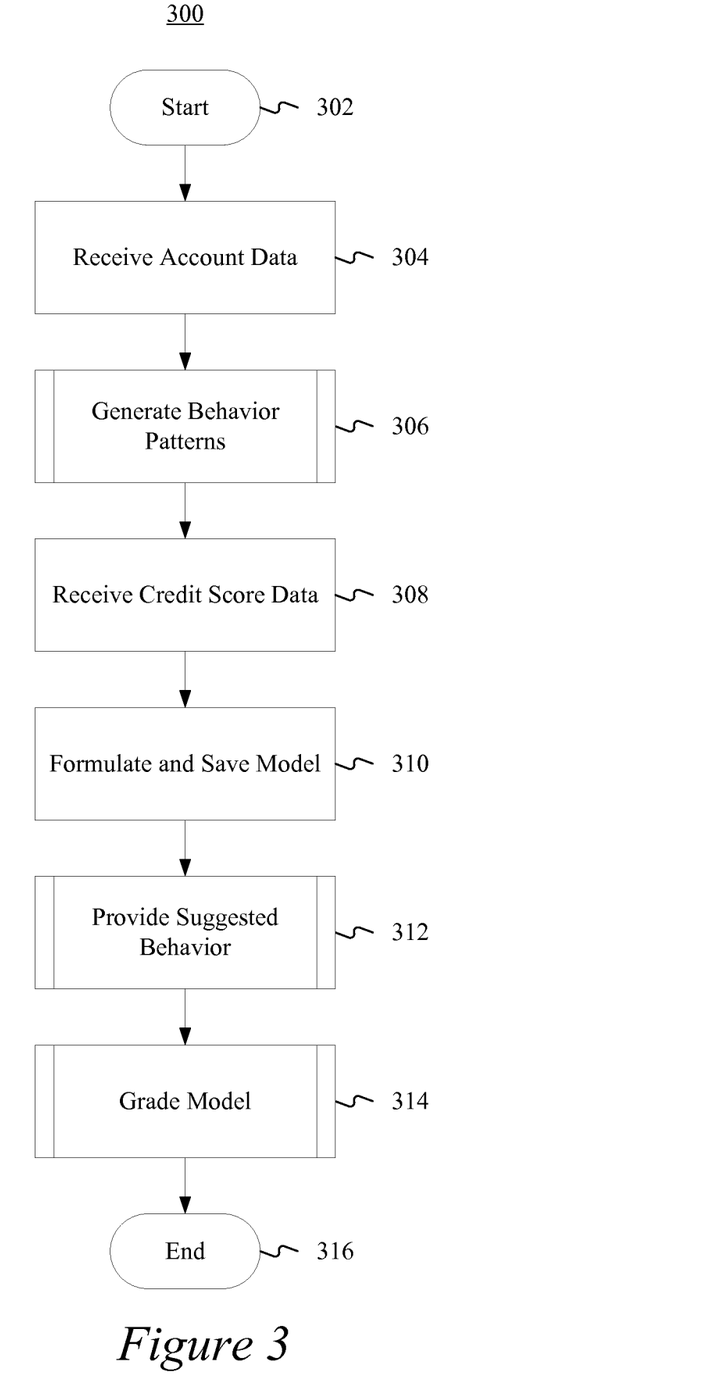
FIG. 3 shows an example method for extracting behaviors and suggesting behaviors to achieve a desired outcome consistent with embodiments of the disclosure.

FIG. 3 shows an example method 300 for extracting behaviors and suggesting behaviors to achieve a desired outcome. Method 300 may begin at stage 302 and proceed to stage 304 where account data may be received. The account data may include information regarding currency outlays made by a sample population. As disclosed herein, the account data and currency outlays may include payment data from payment system 106 and spending data from spending data system 108.

As disclosed herein, the payment data can include an amount a user has paid on his or her various credit accounts. In addition, the payment data can include amounts users have paid on their credit accounts. The payment information can include how much each pays on his or hers various credit accounts, the percent of a credit limit each carries on his or her various credit accounts, a number of days late, if any, payments are made on users various credit accounts, etc.

The spending data can include an amount for a transaction, items or services being purchased, the payor, the location where the purchase took place, information about what forms of payment were used to make the purchase, etc. The spending data can be received via push mechanisms, in response to a request for data, or a combination of the two.

Figure 4:
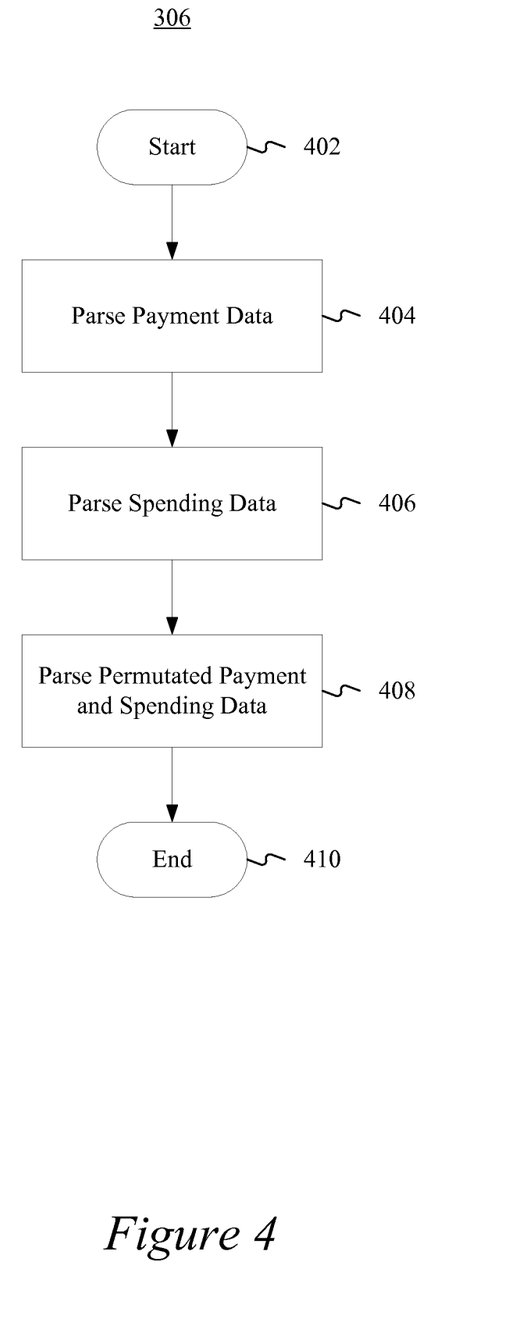
FIG. 4 shows an example subroutine for extracting behaviors consistent with embodiments of the disclosure.

From stage 304 where the spending data and the payment data are received, method 300 may proceed to subroutine 306 where, as discussed with regard to FIG. 4, behavior patterns may be generated. More than one behavior pattern may be generated. The behavior patterns may be extracted from the account data. For example, a single behavior, such as, but not limited to, timeliness of payment, amount of payment, average purchase amount, retailers frequented, etc., may be extracted from the payment data and the spending data.

As discussed herein, a single behavior can be extracted and a plurality of behaviors can be extracted when generating behavior patterns. One or more behaviors can be grouped into patterns of behaviors. For example, users paying their credit card bills in full each month and spending less than X percent of their available credit limit may be considered a pattern of behaviors.

Once behavior patterns have been generated, method 300 may proceed to stage 308 where a credit score data may be received. As discussed above, the credit score data may be received from credit score data system 110 and may include course or find data.

Once the credit score data has been received, the method 300 may proceed to stage 310 where a model may be formulated and saved. The model may predict a change in a user's credit score based on a pattern of behaviors. For example, the model may predict that when users pay down debt (e.g., reduce their credit usage from 50% to 15%) their credit scores rise by X points.

The model may be formulated by determining a credit score change for each of the behaviors extracted or combinations of behaviors (e.g., a pattern of behaviors). For example, a behavior extracted may be opening one or more credit accounts and the resulting change in a users' credit score may be a drop by 10 points. The behavior may be closing one or more credit accounts and the resulting change in a users' credit score may be a drop by 5 points. The behavior may be the users reducing their credit usage from 50% of available credit down to less than 15% of available credit and the resulting change in the users' credit scores may be an increase of 75 points.

The change in credit score can be a fixed point value. For example, a credit score may increase, for a given behavior, from 625 to 700. The change in credit score can be a percentage of a user's credit score. For example, for a given behavior, the various data may show that credit scores increase 5% of a current credit score. For instance, the data may show that for a group of users with a credit score between 600 and 625 paying down credit usage from 50% to 15% leads to a credit score increase of 10%.

Stated another way, the model can be formulated by isolating behaviors or groupings of behaviors and correlating increases or decreases in credit scores for users with the behaviors or groupings of behaviors. The behaviors or grouping of behaviors can be further grouped among similar users. For example, the users can be grouped by age, current credit score, current income level, current credit usage levels, number of credit accounts opened, number of credit accounts closed, etc. In other words, the users can be grouped based on behaviors as well as demographic characteristics. The further grouping of similar users may also be based on various individual types. For example, a behavior that does not necessarily correspond to an age grouping could be used. For example, the other data received from other data system 114 could be banking information that shows savings levels, as nominal dollars, a percentage of income etc. The propensity to save instead of spend all of one's income could be a behavior that is used for grouping.

The correlation of behaviors to credit score changes can be performed using statistical analysis. For example, single and multi-variable regression analysis may be performed to correlate behaviors with changes in credit scores. Other mathematical techniques such as Monte-Carlo simulations can be used to randomly select payment, spending, and credit score data to perform regression analysis. In addition, once a model has been formulated, Monte-Carlo simulations may be used to validate the model against a current data set of know results.

Figure 5:
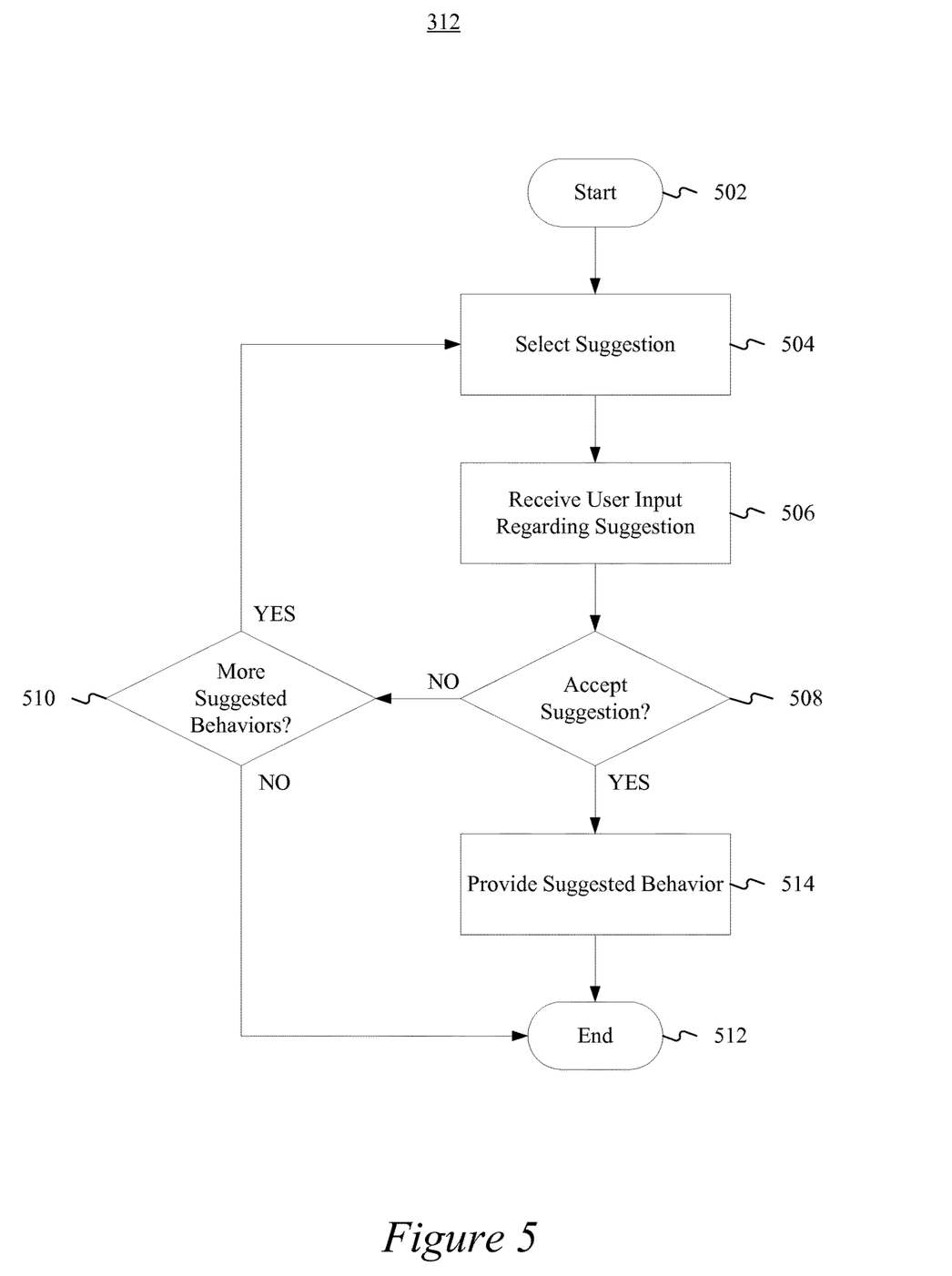
FIG. 5 shows an example subroutine for providing a suggested behavior consistent with embodiments of the disclosure.

Once a model has been formulated, method 300 may proceed to subroutine 312 where a suggested behavior may be provided. As discussed herein, the suggested behavior may be provided in real time. For example, as a user is about to make a purchase, such as buying a cup of coffee and a breakfast pastry, computing device 102 may provide a suggested behavior. The suggested behavior may be to not buy the cup of coffee or the breakfast pastry and instead, put the money that would have paid for the coffee or pastry towards paying down a balance on a credit card.

The suggested behavior may also be given periodically. For example, at the start of every weekday or the start of each week, computing device may suggest to the user to not buy a cup of coffee and a breakfast pastry and instead put the money used for the purchases towards paying down a credit card debt.

The suggested behaviors may be matched to a user type. For example, certain types of users, maybe those that have high credit scores, may tend to follow the suggestions more often than other user types, say those that are in their early 20's. As a result, when selecting suggested behaviors computing device 102 may factor in a user's user type or other characteristics of the user to select suggested behaviors the user is more likely to follow.

The suggested behavior does not have to involve a specific behavior the user may do. For example, the suggested behavior may be to advise the user to look for ways to cut expenses. For example, the suggested behavior may be displayed, on user interface 214, as a message that reads "When shopping, look for one item that you can avoid purchasing." Another example might read "If you cut spending $20 a week you can put the saved $20 toward your credit card bills and after six months your credit score will increase by 50 points." As shown in the previous example, the suggested behavior, when presented to the user, may include a predicted result of following the suggested behavior.

The suggested behavior may also be dependent on the user match to the behavior. For example, if the user is likely to respond to data presented in a herd mentality fashion, the suggestion might be, "All your closest Facebook friends are doing it, you should too." As another example, if the person is motivated by status, the suggestion might be, "People your age with your income have credit scores about 50 points higher than your credit score." Other data collected from other data system 114 can be used to further customize the suggestions. For example, other data system 114 may be a DMV record showing the types of cars various users own. As such, the suggested behavior that uses status to motivate a user might read "Others your age drive higher end cars than you do. If you increase your credit score you could have a nicer car too."

From subroutine 312 where the suggested behavior was provided, method 300 may proceed to subroutine 314 were the model may be graded. The model may be graded on how well the user's credit score changed in regard to the user following the suggested behavior. For example, and as will be discussed with regard to FIG. 6, if a user engaged in the suggested behavior and the user's credit score changed by the predicted amount, the model may be scored positively. If the user engaged in the suggested behavior and the user's credit score did not change by the predicted amount, but still increased, the model may be scored less positively. If the user engaged in the suggested behavior and the user's credit score went down, the model may be scored negatively.

From subroutine 314 where the model is graded, method 300 may proceed to stage 316 where method 300 may terminate.

FIG. 4 shows an example subroutine 306 for generating behavior patterns consistent with the disclosure. Subroutine 306 may begin at stage 402 and may proceed to stage 404 where payment data may be parsed. For example, computing device 102 may cycle through the payment data and equate each data to a behavior. For example, each payment may represent a behavior. Different behaviors with the same or similar characteristics can be grouped together as a behavior. For instance, payments made on time may represent a first behavior, payments made between 1 and 30 days late may represent a second behavior, and payments made between 31 and 60 days late may represent a third behavior. Credit card balances paid in full may represent a fourth behavior, credit card balances paid via a minimum payment may be a fifth behavior, and credit card balances paid greater than the minimum payment, but less than in full, may be a sixth behavior. The above examples of payments that equate to a behavior are non-limiting examples. In other words, any type of payment that a credit provider may report can be a behavior.

From stage 404 where the payment data is parsed, subroutine 306 may proceed to stage 406 where spending data may be parsed. Computing device 102 may cycle through the spending data and equate each data to a behavior. For example, a user may purchase a cup of coffee every weekday and the purchase may be a behavior (i.e., a purchase on Monday, a purchase on Tuesday, etc.) or as a pattern of behavior (i.e., a daily purchase). Every Friday a user may purchase approximately $100 in groceries. The spending on groceries every Friday may be a behavior.

Depending on the coarseness or fineness of the spending data, the number of behaviors that can be extracted from the spending data can vary. For example, course data that only includes a monthly amount spent may lead to a single behavior (e.g., dollars spent per month). Spending data that includes a daily amount spent may lead to seven behaviors (e.g., an average amount spent per day of the week). Spending data that is broken down by amount spent per merchant may result in behavior for each merchant. For example, if a user buys a cup of coffee every weekend from a particular coffee shop, the behavior may be dollars spent per week at the particular coffee shop or average dollars spent per day at the particular coffee shop.

Multiple spending events may be combined and be extracted as a single behavior. As in the example above, a daily purchase at a coffee shop can be extracted as a daily amount spent at the coffee shop. In addition, the amount spent at the coffee shop may be combined with other amounts spent at other merchants to extract a behavior equated to spending an average amount per day. For example, the user may purchase the coffee in the morning from the same coffee shop, but may purchase lunch every day from a variety of venders throughout the week. The amount spent for lunch each day may be combined with the amount spent for coffee each day to arrive at an average spent each day for food. The average amount spent each day for food could be extracted as a behavior.

From stage 406 where the spending data is parsed, subroutine 306 may proceed to stage 408 where permutations of the spending data and the payment data may be parsed. For example, each behavior parsed in stage 404 may be paired with a behavior parsed in stage 406 to create a new behavior or a new pattern of behavior. For instance, a behavior parsed in stage 404 may be paying the balance of a credit card in full each month and a behavior parsed in stage 406 may be utilizing less than 30% of available credit each month. Thus, the permutated behavior or behavior pattern may be paying credit card balances in full each month and utilizing less than 30% of available credit.

The various permutations of data can be considered patterns of behaviors. For example, users that pay their credit card balances in full each month and utilize less than 30% of available credit may exhibit a first pattern of behavior. Users that pay their balance in full each month, utilize less than 30% of available credit, and spend $30 at a coffee shop each week may exhibit a second pattern of behavior. Stated another way, the number of patterns of behavior is limited only be the maximum number of permutations of payment data and spending data and other data about the user that might not pertain to payment and spending but is a behavior common to those who achieve a certain credit score within a certain amount of time. From stage 408 where the permutated data is parsed, subroutine 306 may terminate at stage 410.

FIG. 5 shows an example subroutine 312 for providing a suggested behavior consistent with the disclosure. Subroutine 312 may begin at stage 502 and proceed to stage 504 where a suggested behavior may be selected. The selected behavior may be selected using the model formulated in stage 310 of method 300. For example, each of the extracted behaviors may predict a different change in a user's credit score. The various behaviors may be ranked based on the predicted change in the user's credit score. For instance, a first behavior may predict a 25 point increase in the user's credit score, a second behavior may predict a 20 point increase in the user's credit score, and a third behavior may predict a 10 drop in the user's credit score. As a result, a first time stage 504 is encountered computing device 102 may select the first behavior.

From stage 504 where a behavior is selected, subroutine 312 may proceed to stage 506 where a user input regarding the behavior selected is received. For example, at stage 506 a user, using I/O interface 220, may reject or accept the suggestion. From stage 506 where the input regarding the suggesting is received, subroutine 312 may proceed to decision block 508.

At decision block 508 if the user rejected the suggestion, subroutine 312 may proceed to decision block 510 to determine if more suggested behaviors are available based on the user's best match to others similar to him or her that did take the behavioral actions to improve their credit score. If no more suggested behaviors are available, subroutine 312 may terminate at stage 512. The number of suggested behaviors may be set to a maximum number of suggested behaviors. For example, after all the suggested behaviors are ranked, the top 5 suggested behaviors may be available for presentation to the user. The rejected behaviors may also count as a negative score. For example, rejected behaviors may be negatively scored so the model can be refined for a user. For instance, if a user constantly rejects a certain type of behavior, there is no need to constantly recommend that type of behavior. Thus, the use of negative scoring for rejected behaviors can allow computing device 102 to learn what behaviors work for a given type of user.

From decision block 510, subroutine 312 may proceed to stage 504 if more suggested behaviors are available. For example, if the user rejected the first suggested behavior during the first instance of stage 504, the second suggested behavior may be selected at the second instance of stage 504. From stage 504 subroutine may proceed to stage 506 and to decision block 508 as described above.

At decision block 508 the user accepts the suggested behavior, subroutine may proceed to stage 514 where the accepted suggested behavior is provided. From stage 514 subroutine 312 may terminate at stage 512.

As indicated above, a suggested behavior could result in a drop in a user's credit score. In the example above, the third suggestion may predict a 10 point drop in the user's credit score. The third suggested behavior may be to ignore all suggestions provided by computing device 102. For instance, the user may be about to purchase a cup of coffee and a breakfast pastry. The first suggested behavior might be that the user do not purchase either and put the savings toward a credit card debt. The second suggested behavior might be to purchase only one of the items and put the savings towards the credit card debt. The third suggested behavior may allow the user to ignore all the suggested behaviors and purchase both the coffee and the pastry.

Each of the suggested behaviors may include a note that advises the user of a predicted change in his or her credit score based on accepted the suggested behavior. For example, the first suggested behavior may include a message to the user that 95% of the people that purchase both items at the frequency the user does and have similar profiles have low credit scores and trouble paying their credit card bills on time. The second suggested behavior may include a message to the user that 85% of people that visit the coffee shop only buy one of the items. The third suggested behavior may include a message to the user that continuing with his or her planned action may result in a drop in his or her credit score.

Figure 6:
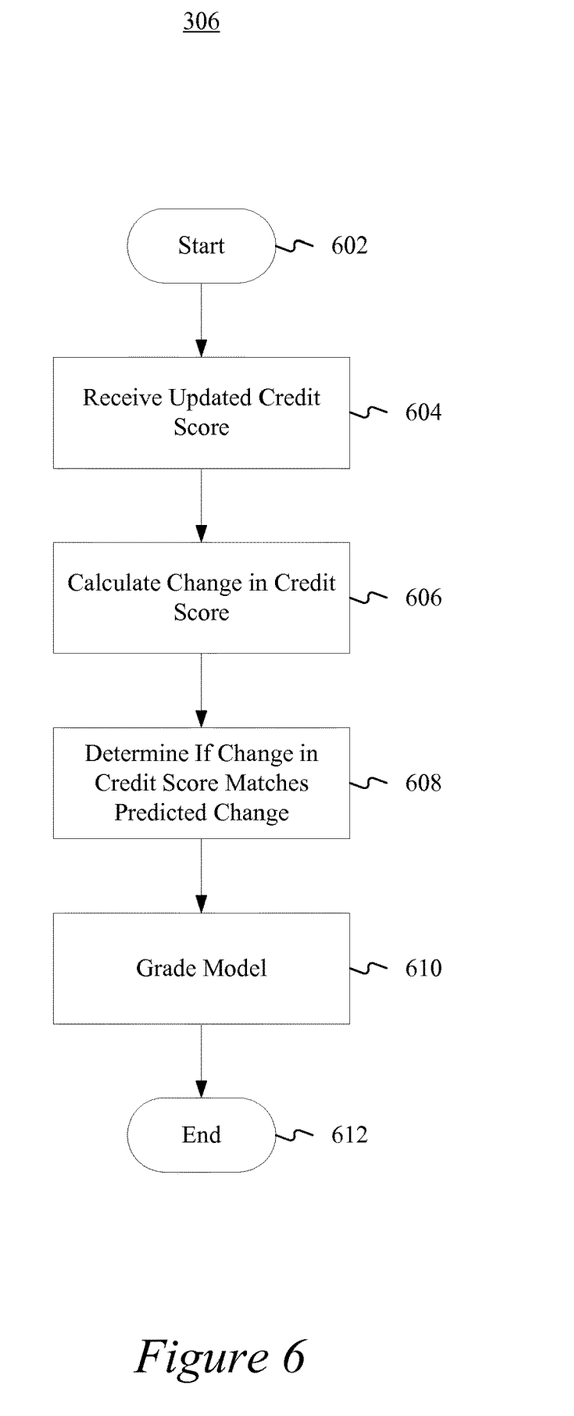
FIG. 6 shows an example subroutine for grading a model consistent with embodiments of the disclosure.

FIG. 6 shows an example subroutine 314 for grading a model consistent with the disclosure. Subroutine 314 may begin at stage 602 and proceed to stage 604 where an updated credit score may be received. For example, at stage 604 computing device 102 may receive an updated credit score from credit score data system 110.

From stage 604 subroutine 314 may proceed to stage 606 where a change in the user's credit score may be calculated. For example, using the updated credit score received at stage 604, computing device 102 may determine how much the user's credit score increased or decreased from a former credit score. For instance, if the user's last known credit score was 625 and the updated credit score is 630, then computing device 102 would calculate a change in the user's credit score of 5 points.

From stage 606 subroutine 314 may proceed to stage 608 where a determination is made as to whether the change in the user's credit score matches the predicted change given by the model. From stage 608 subroutine 314 may proceed to stage 610 where the model may be graded based on the determination of the change in the user's credit score. The grading of the model may be numeric and may be positive or negative. For example, if the predicted change in the user's credit score was 5 points and the actual change in the user's credit score was 5 points the model may be graded a +10. If the predicted change in the user's credit score was 5 points and the actual change in the user's credit score was 10 points, the model may be scored a +12. If the predicted change in the user's credit score was 5 points and the actual change in the user's credit score was 1 point the model may be scored a −4.

The numeric grade can be a function of the difference between the predicted change in the user's credit score and the actual change in the user's credit score. The use of numeric scoring can allow for refinement of the model. For example, if a suggested behavior predicts a high change in a credit score but consistently delivers a lower change in credit scores, then over time, the lower numeric grading can allow computing device 102 to adjust the model and give less weight to the suggested behavior. If a suggested behavior consistently delivers a greater increase in a credit score than predicted by the model when applied to the target user type, a higher numerical grading can allow computing device 102 to give greater weight to the suggested behavior. If scores for various behaviors in the model reach a threshold, the various behaviors can be removed from the model.

Stated another way, the model attempts to correlate behavior, targeted at the matching user type, with changes in a credit score. Because correlation is not causation, some behaviors that may correlate with changes in a credit score may not actually be a cause of the changes in the credit score. The use of numerical grading of the model and the various behaviors that are used as variables in the model, may allow computing 102 device to self-refine the model. The self-refinement may allow for terms (i.e., behaviors) in the model that correlate highly to changes in a credit score, but are not actually causes for changes in a credit score to be weighted less and less over time. In addition, terms in the model that may not correlate highly to changes in a credit score, but are actually causes for changes in a credit score may be weighted more and more over time. From stage 610 subroutine 314 may terminate at stage 612.

In addition to allowing users to better adjust behaviors to increase their credit scores, the systems and methods here can allow other entities (e.g., banks, credit unions, etc.) to generate their own credit scores for users. Using the systems and methods described herein the other entities may be able to customize the model to suit their needs. This could eliminate the need to used "black box" type services from credit bureaus and others that generate credit scores that may not take into account factors that are of interest to the other entities. For example, a bank may have a customer that has been a very loyal customer for a long time. This customer may not have borrowed money in the last 10 years and does not have any credit cards. So using third party generated credit scores, this customer may have a very low credit score because the customer does not typically use credit. The bank in this instance may utilize the system and methods disclosed herein and generate a credit score for the user that includes factors such as net worth, income, length of time as a customer with the bank, etc. Using this generated credit score may allow the bank to make a better informed decision about how much money to lend the customer and at what interest rate.

Other embodiments may relate to a method of improving a user's credit score, the method comprising: identifying at least one potential transaction that the user can perform; assessing whether the at least one potential transaction may have a positive effect on the user's credit score; and recommending the at least one potential transaction to the user in the event that the at least one potential transaction has a positive effect on the user's credit score. Assessing whether the at least one potential transaction may have a positive effect on the user's credit score may include assessing which of a plurality of potential transactions would have the most positive effect on the user's credit score, and recommending includes recommending the potential transaction that has the most positive effect.

While the above examples have been directed to changes in a credit score, the systems and methods can be used in other fields. For example, the behaviors do not have to be financial. The behaviors may be directed to improving a person's physical health. For instance, the suggestions may be to exercise and perform certain exercises for certain durations.

For example, instead of spending and payment data, exercise routines, family histories, and medical conditions could be analyzed. For instance, people with a given family history may experience a common medical condition. Through the analysis presented herein, a model may be developed that suggests that if a person engages in a given exercise routine, the medical condition may be less severe later in life.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving, via a network, account data including information regarding currency outlays made by a first sample population;
   generating, by a computing device, a plurality of behavior patterns based on currency outlay patterns extracted from the account data and age groups for the first sample population;
   receiving, by the computing device, credit score data for the first sample population;
   formulating, by the computing device, a model for predicting a credit score change, the model including variables corresponding to each of the plurality of behavior patterns and a likely credit score affect;
   storing the model on a data storage device;
   receiving, by the computing device, account data of a subject,
   extracting, by the computing device, behavior patterns of the subject from the account data of the subject,
   matching the subject's extracted behavior patterns with select behavior patterns included in the model that are likely to improve a credit score of the subject based on following a behavior of the select behavior patterns,
   transmitting, to a user device, the select behavior patterns as behavior recommendations for the subject and the likely credit score affect,
   transmitting, to the user device, a message identifying at least one of the plurality of behavior patterns and the likely credit score affect,
   wherein the at least one of the plurality of behavior patterns include:
      a behavior a user of the user device has repeated on a regular basis in the past and is likely to repeat in the near future, and
      behaviors of friends of the user of the user device;
   implementing the at least one of the plurality of behavior patterns;
   receiving updated credit score data for the first sample population;
   processing each credit scored included in the updated credit score data by:
      when an updated credit score of an individual is greater than the individual's previous credit score, grading the model with a positive value, and
      when the updated credit score of the individual is less than the individual's prior credit score, grading at least one of the behavior patterns with a negative value; and
   removing a behavior pattern from the model when an accumulation of negative values exceeds a threshold.

2. The method of claim 1, wherein the information regarding currency outlays includes information regarding payments made on credit accounts by the first sample population and spending data including information regarding purchases made.

3. The method of claim 2, wherein the plurality of behavior patterns includes a plurality of payment and spending behaviors that are defined by at least one payment characteristic of the payments made on the credit accounts and at least one spending characteristic of the purchases made, respectively.

4. The method of claim 3, wherein the at least one payment characteristic includes at least one of an on-time payment, a payment in full, and a minimum payment.

5. The method of claim 3, wherein the at least one spending characteristic includes at least one of a consumer purchase and a regularly occurring purchase.

6. The method of claim 3, wherein generating the plurality of behavior patterns includes defining permutations of the plurality of payment and spending behaviors.

7. The method of claim 1, wherein the credit score data corresponds to the information regarding currency outlays.

8. The method of claim 1, wherein the model is formulated according to at least one of a statistical analysis, a Monte Carlo simulation, a single variable regression analysis, and a multivariable regression analysis.

9. The method of claim 1, further comprising validating the model against account and credit score data of a second sample population.

10. A system comprising:
   a network interface device;
   a processor; and
   a memory that store instructions that, when executed by the processor, cause the processor to perform operations comprising:
      receiving, via the network interface device, account data including information regarding currency outlays made by a first sample population,
      generating a plurality of behavior patterns based on currency outlay patterns extracted from the account data and age groups for the first sample population,
      receiving credit score data for the first sample population,
      formulating a model for predicting a credit score change, the model including variables corresponding to each of the plurality of behavior patterns and a likely credit score affect,
      storing, to the memory, the model,
      receiving account data of a subject,
      extracting behavior patterns of the subject from the account data of the subject,
      matching the subject's extracted behavior patterns with select behavior patterns included in the model that are likely to improve a credit score of the subject based on following a behavior of the select behavior patterns,
      transmitting, to a user device, the select behavior patterns as behavior recommendations for the subject and the likely credit score affect,
      wherein at least one of the select behavior patterns include:
         a behavior a user of the user device has repeated on a regular basis in the past and is likely to repeat in the near future, and
         behaviors of friends of the user of the user device, receiving an indication that the user implemented the at least one of the behavior recommendations, receiving updated credit score data for the first sample population;

processing each credit scored included in the updated credit score data by:

when an updated credit score of an individual is greater than the individual's previous credit score, grading the model with a positive value, and when the updated credit score of the individual is less than the individual's prior credit score, grading at least one of the behavior patterns with a negative value; and removing a behavior pattern from the model when an accumulation of negative values exceeds a threshold.

11. The system of claim 10, wherein the information regarding currency outlays includes information regarding payments made on credit accounts by the first sample population and spending data including information regarding purchases made.

12. The system of claim 11, wherein the plurality behavior patterns include s a plurality of payment and spending behaviors that are defined by at least one payment characteristic of the payments made on the credit accounts and at least one spending characteristic of the purchases made, respectively.

13. The system of claim 12, wherein the at least one payment characteristic includes at least one of an on-time payment, a payment in full, and a minimum payment, wherein the at least one spending characteristic includes at least one of a consumer purchase and a regularly occurring purchase, and wherein generating the plurality of behavior patterns includes defining permutations of the plurality of payment and spending behaviors.

14. The system of claim 10, wherein the credit score data corresponds to the information regarding currency outlays.

* * * * *